UNITED STATES PATENT OFFICE.

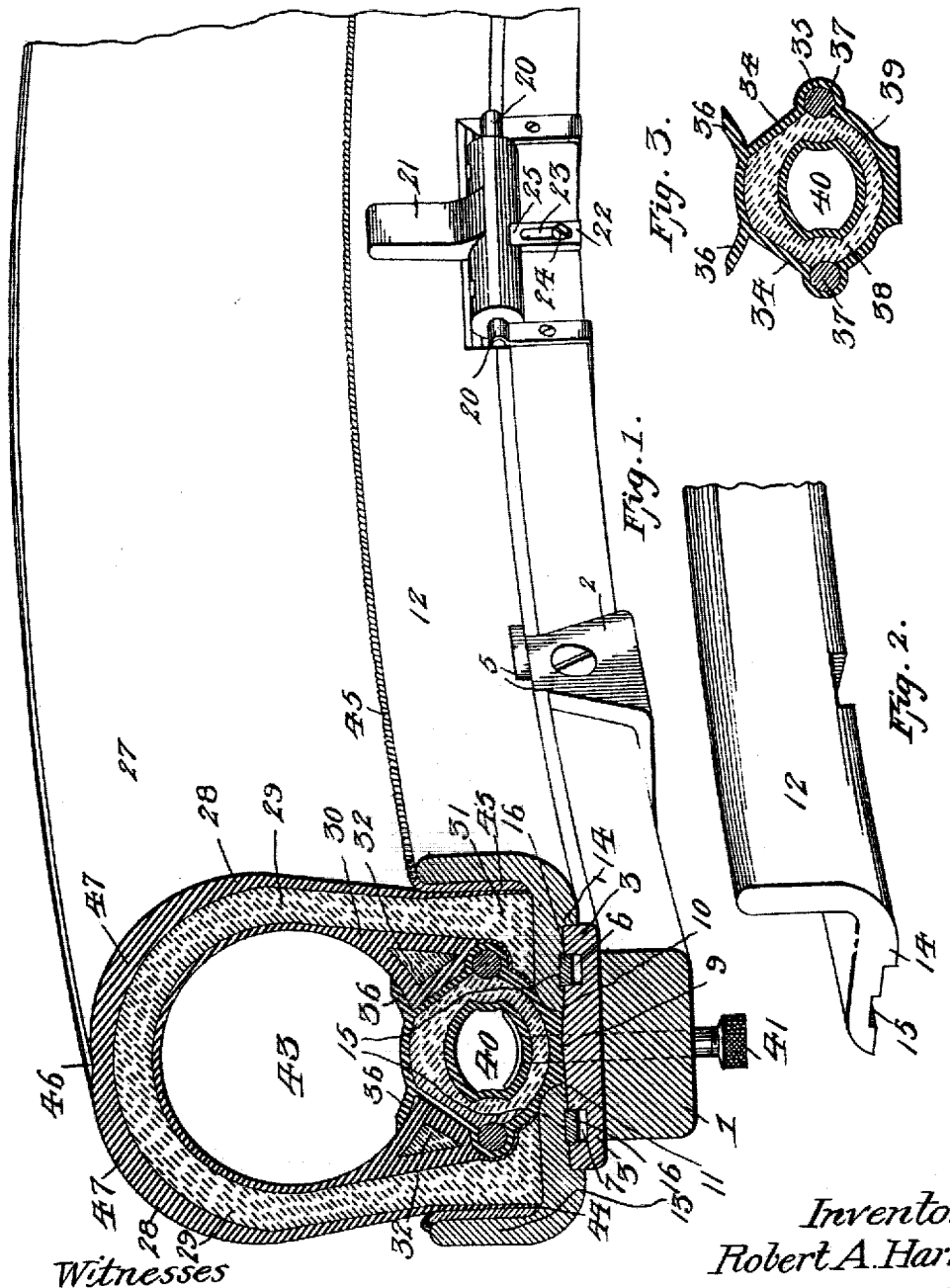

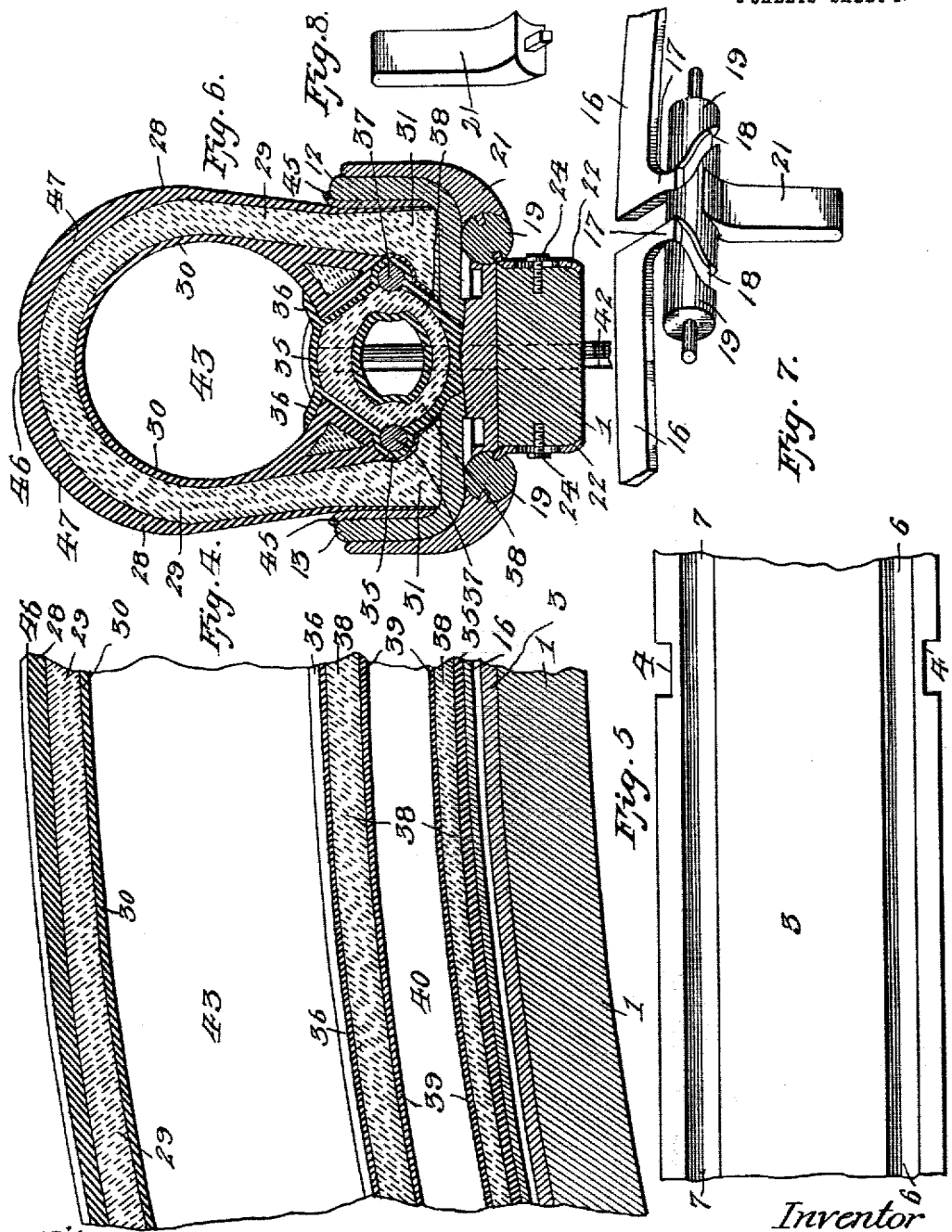

ROBERT A. HARRIS, OF TUCSON, ARIZONA TERRITORY.

PNEUMATIC TIRE.

No. 815,346.  Specification of Letters Patent.  Patented March 20, 1906.

Application filed September 24, 1904. Serial No. 225,817.

*To all whom it may concern:*

Be it known that I, ROBERT A. HARRIS, a citizen of the United States, residing at Tucson, in the county of Pima and Territory of Arizona, have invented new and useful Improvements in Pneumatic Tires, of which the following is a specification.

This invention relates to pneumatic tires.

One object of the invention is to improve and simplify the means for detachably holding the tire in position upon the wheel-rim.

With the foregoing and other minor objects in view, which will appear as the description proceeds, the invention resides in a wheel having a supplemental rim formed with grooves, tire-flanges having grooves therein registering with the grooves in the supplemental rim, a split ring in each pair of registering grooves, each split ring having lateral projections on its end, cylindrical elements having cam-grooves therein to receive the lateral projections, and means for rotating and locking said cylindrical elements.

The invention also resides in a pneumatic tire having a circumferential depression in the center of its tread-surface whereby the portions of the tread-surface on opposite sides of the depression, which have a tendency to wear through quickly, will be thickened to increase their durability.

Furthermore, the invention resides in the particular combination and arrangement of parts and in the precise details of construction hereinafter described and claimed as a practical embodiment of the invention.

In the accompanying drawings, forming part of this specification, Figure 1 is a perspective view of a tire constructed in accordance with the invention. Fig. 2 is a similar view of one of the tire-flanges. Fig. 3 is a cross-section through the locking-ring. Fig. 4 is a longitudinal vertical section through the tire and wheel-rim. Fig. 5 is a plan view of the supplemental rim. Fig. 6 is a transverse section through the wheel-rim and tire. Fig. 7 is a perspective view of one of the grooved cylindrical elements for locking the split rings. Fig. 8 is a similar view of the removable handle of one of the grooved cylindrical elements.

Like reference-numerals indicate corresponding parts in the different views.

The reference-numeral 1 indicates the rim of a wheel, which may be of any ordinary form and construction. Secured upon the rim 1 in any suitable manner, as by means of brackets 2, is a supplemental rim 3, said supplemental rim being formed with slots 4 at intervals to receive the extensions 5 of the brackets 2. The supplemental rim 3 is formed with a pair of grooves 6 7 and is thickened circumferentially at its longitudinal center, as shown at 9, to form the inclined faces 10 11. Mounted upon each of the inclined faces 10 11 of the supplemental rim is an angular tire-flange, such as 12 13. Each of the tire-flanges 12 13 is formed with a shoulder 14, which fits down over the outer edge of the supplemental rim 3. Each angular tire-flange is also formed with a circumferential groove 15, which when the tire-flange is in position registers with one of the grooves in the supplemental rim 3 to form an annular chamber to receive a split ring, such as 16, the ends of each split ring 16 being formed with lateral extensions 17, which fit into cam-grooves 18 in a cylindrical element 19, as shown in Fig. 7, said cylindrical element 19 being journaled in brackets 20, fastened to the wheel-rim 1. Each of the cylindrical elements 19 is provided with a detachable handle 21, as shown in Fig. 8.

It will be understood that by rotating the cylindrical elements 19 in one direction the ends of the split rings 16 will be drawn together and by rotating said cylindrical elements in the opposite direction the ends of said split rings will be forced apart. In applying one or both of the tire-flanges 12 13 as hereinafter described the cylindrical elements 19 are rotated to draw together the ends of the split rings 16, so that said rings will be contracted and caused to lie in the grooves 6 7 of the supplemental rim 3. The tire-flanges may then be fitted in position beneath the tire and held in place by rotating the cylindrical elements in the opposite direction until the split rings 16 expand and by engaging the grooves of the tire-flanges and the grooves of the supplemental rim, as shown in Fig. 1, hold said flanges securely in position. After the tire-flanges are locked in place the handle 21 of each cylindrical element 19 may be removed and each of said elements may be locked against accidental rotation by means of a locking member 22, having a slot 23, through which extends a pin 24. When the locking member 22 is moved upwardly, its end 25 fits into a suitable socket in the cylindrical element. It will be understood that the inclined faces 10 11 of the supplemental rim 3 facilitate the introduction of the angular tire-flanges 12 and 13 beneath the tire.

As shown in Figs. 1 and 6, the tire consists of an outer case 27, which is composed of a layer of rubber 28, a layer of canvas or other fabric 29, and an internal layer of rubber 30. The fabric layer 29 is thickened at its lower end, as shown at 31, and the internal layer 30 is thickened at its lower end by embedding therein a fabric, such as 32. Fitted between the meeting ends of the case 27 is a locking-ring 34, such as shown in Fig. 3, said locking-ring 34 comprising an outer covering 35, having wings 36 to fit over the internal thickened portion of the case 27, strengthening-wires 37, a fabric layer 38, an internal layer 39, and an air-chamber 40, which is supplied with air by a suitable valve, such as 41, a similar valve 42, which extends through said locking-ring 34 supplying air to the chamber 43 of the outer case.

It will be noted that the locking-ring has inclined upper edges 48, against which the angular foot portion 49 of the inner layer or casing 30 of the tire rests. The strengthening-wires 37, located between the fabric layer 38 and the outer covering 35 of the locking-ring, form offsets or projections around which the lower extended portion of the layer 30 of the tire proper extends. By this arrangement of parts it will be noted that inflation of the locking-ring will securely hold the inner layer 30 in place, and owing to the inclined portions, 48 and 49 a sealing of the joints between the locking-ring and the inner layer 30 occurs. The inflation of the locking-ring binds the wire 37 against the surrounding portion of the layer 30 of the tire proper, securely locking the tire proper in place, which lock, it is evident, is wholly within the tire, and yet readily accessible to permit removal of the tire. As the enlarged angular foot of the inner layer 30 of the tire proper bears directly against the locking-ring and as the latter is suitably inflated, it is evident that a solid support is formed for the inner layer or the tire proper.

It is to be understood that the locking-ring is to be inflated through the valve 41 and the main chamber 43—that is, the tire proper is to be inflated through the valve 42. Both these valves are carried by the locking-ring, the latter projecting wholly through the ring and opening above the outer covering 35 thereof. It is my purpose to inflate the ring at a higher pressure than the tire proper, whereby the ring, through the structure hereinbefore described, acts to hold the inner layer 30 in proper position and at the same time effectively seal the same against leakage of air. In addition to this function the locking-ring is also designed to serve in emergency cases as a tire proper, whereby to protect the ring should the main tire be punctured or damaged.

45 represents what I term "guard-strips," being held between the tire-flanges 12 and 13 and the adjacent side of the outer casing 27 of the tire proper. The faces of these strips adjacent the tire are corrugated to grip the layer 27 and are designed to be secured to the flanges 12 and 13 in any desired manner—such, for example, as cementing. It may be found desirable to wholly dispense with these strips and to corrugate or roughen the inner faces of the flanges 12 and 13, whereby to effect the same result. The flanges are designed primarily to prevent creeping of the tire in the rim-flanges and enable me to wholly dispense with the usual nuts and bolts for this purpose. The guard-strips are effective throughout their length, while the usual bolt is of course effective only at its point of application.

The locking-ring is of peculiar sectional shape, the chamber 40 therein being practically oval, whereby the force of the contained air under pressure operates most effectively to seal the joint between the locking-ring and inner layer of the tire proper and also to lock said inner ring by the pressure exerted by the wires 37. The upper portion of the locking-ring is thickened, as shown in Figs. 3 and 6, so as to resist the tendency of the locking-ring to assume a circular form when inflated.

The broad tread at the base of the fabric layer 29 is very effective as a support in the use of the tire. The tread-surface of the case 27 is formed centrally with a circumferential depression 46, the purpose of which is to thicken said tread-surface at the points marked 47, whereby the life of the tire is greatly prolonged, as it has been found in practice that the greatest wear of the tread-surface falls upon the points 47 both in rounding curves and when the tire strikes an obstruction and is deflected to one side or the other.

The improved tire of this invention may be assembled in a number of different ways. One convenient way is to place the locking-ring 34 upon the supplemental rim 3, fit the outer case 27 around said locking-ring, and then apply the angular tire-flanges 12 13 to hold the various parts of the tire securely in assembled position.

It will be observed that the tire-flanges 12 13 are slotted adjacent to the brackets 2, so that said flanges may be removed and replaced without the necessity of removing the brackets 2.

Changes in the precise embodiment of invention illustrated and described may be made within the scope of the following claims without departing from the spirit of the invention or sacrificing any of its advantages.

Having thus described the invention, what is claimed is—

1. The combination with a wheel-rim, of a supplemental rim formed with grooves, tire-flanges having grooves therein registering with the grooves in the supplemental rim, a split ring in each pair of registering grooves, each split ring having lateral projections on its ends, cylindrical elements having cam-grooves therein to receive the lateral projections of said split rings, and means for rotating and locking said cylindrical elements.

2. The combination with a wheel-rim, of a supplemental rim formed with grooves and slots, angular tire-flanges formed with slots, and having grooves therein registering with the grooves in the supplemental rim, a split ring in each pair of registering grooves, each split ring having lateral projections on its ends, cylindrical elements having cam-grooves therein to receive the lateral projections on the split rings, each of said cylindrical elements having a removable handle, sliding locking members on the wheel-rim to lock the cylindrical elements, and brackets upon the wheel-rim fitting into the slots of the supplemental rim and angular tire-flanges.

3. The combination with a wheel-rim, of a supplemental rim formed with grooves and inclined faces, tire-flanges fitted upon said inclined faces, and having grooves therein registering with the grooves of the supplemental rim, a split ring in each pair of registering grooves, each split ring having lateral projections on its ends, cylindrical elements having cam-grooves therein to receive the lateral projections on the split rings, means for rotating and locking said cylindrical elements, a tire-case having its ends fitted between the tire-flanges, said ends having internal enlargements, and a locking-ring located between the ends of said case, said locking-ring having wings fitted over the internal enlargements of the case.

4. The combination with a wheel-rim, of a tire supported thereby, means interiorly of the tire to lock the same to the rim, and guard-strips interposed between the rim and the tire, said guard-strips being secured to the rim, and roughened on their faces adjacent the tire.

5. The combination with a wheel-rim, of a tire thereon, and a locking-ring for securing the tire in position, said locking-ring having an air-chamber approximately elliptical in cross-section and being thickened on one side of said air-chamber for the purpose specified.

In testimony whereof I affix my signature in presence of two witnesses.

ROBERT A. HARRIS.

Witnesses:
V. S. GRIFFITH,
GEO. G. BRONSON.